United States Patent [19]

Kurihara

[11] Patent Number: 4,749,224
[45] Date of Patent: Jun. 7, 1988

[54] DEVICE FOR MOUNTING WINDOW GLASS MOLDING

[75] Inventor: Kazumasa Kurihara, Yokohama, Japan

[73] Assignee: Nifco Inc., Yokohama, Japan

[21] Appl. No.: 942,173

[22] Filed: Dec. 16, 1986

[30] Foreign Application Priority Data

Dec. 26, 1985 [JP]  Japan .................. 60-200906[U]

[51] Int. Cl.$^4$ ............................................. B60J 1/00
[52] U.S. Cl. ................................. 296/201; 52/397
[58] Field of Search ............... 296/93, 84 A, 84 D, 296/84 G, 201; 52/208, 397, 717.1; 49/460, 462

[56] References Cited

U.S. PATENT DOCUMENTS

| | | | |
|---|---|---|---|
| 1,731,629 | 10/1929 | Ledwinka | 296/201 |
| 1,814,261 | 7/1931 | Potter | 296/84 G |
| 2,812,558 | 11/1957 | Lobanoff | 296/93 |
| 3,155,204 | 11/1964 | Campbell et al. | 52/208 |
| 3,274,740 | 9/1966 | Hall | 52/208 |
| 4,147,006 | 4/1979 | Kruschwitz | 52/717.1 |
| 4,379,379 | 4/1983 | Sengoku | 52/397 |
| 4,396,223 | 8/1983 | Drexel et al. | 296/201 |

*Primary Examiner*—Robert B. Reeves
*Assistant Examiner*—Carol L. Olson
*Attorney, Agent, or Firm*—Trexler, Bushnell, Giangiorgi & Blackstone, Ltd.

[57] ABSTRACT

A mounting device for mounting a molding covering the edges of a window glass on a vehicle body. The device comprises a molding holding member, a mounting member to be mounted on the vehicle body and flexible large and small arms for integrally coupling the molding member and the mounting member to each other.

3 Claims, 2 Drawing Sheets

DEVICE FOR MOUNTING WINDOW GLASS MOLDING

FIELD OF THE INVENTION AND RELATED ART STATEMENT

This invention relates to a device for mounting on the body of an automobile a molding for urging a window glass of the automobile against the automobile body.

The window glass of a vehicle is covered along the edges by a molding. FIG. 1 shows a prior art structure of mounting a molding on a vehicle. As is shown, a rear window glass 14 is secured to a body 10 of the vehicle with an adhesive 12 provided between the two.

A side molding 18 is provided along the edges of the window glass 14. A bracket 20 projecting from the side molding 18 is secured together with a lower molding 22 to the body 10 using a screw grommet 26, which is formed separately from a tapping screw 24 and the bracket 20 and preliminarily mounted in a body hole. After the positioning of a hole provided in the screw grommet 26 and a mounting hole 28, the tapping screw 24 is screwed to cause expansion of the screw grommet 26, whereby the body 10 and bracket 20 are firmly coupled together. As a result, the edges of the window glass 14 are firmly urged against the body 10 by the side molding 18. The side molding 18 has one end covered by the rear window glass 14 and the other end covered by a separate elongate cover projecting from the body which has the bracket 20 mounted thereon, as shown in FIG. 1.

With this structure, separation of the mounting hole 28 of the bracket 20, through which the tapping screw 24 is provided, and the mounting position of the screw grommet 26 is liable to result, making the assembly difficult.

For this reason, use has heretofore been made of a structure as shown in FIG. 2 in which a clip having a bracket 20 and a screw grommet 26 integral with each other is secured to the body hole. In this case, the screw grommet 26 can be readily inserted into a mounting hole formed in the body 10 by displacing the bracket 20. However, it is impossible to absorb any dimensional error in the distance between the rear window glass 14 and body 10 due to fluctuations in the thickness of an adhesive 12. Therefore, a gap is produced between the side molding 18 and the rear window glass 14, and the bracket 20 and body 10 are not in close contact with each other. Therefore, rainwater is liable to intrude into the body 10 from between the screw grommet 26 and the mounting hole of the body 10.

OBJECT AND SUMMARY OF THE INVENTION

An object of the invention is to provide a device for mounting a window glass molding, which permits simple mounting of the window glass molding on the vehicle body and permits the molding to be held reliably on the vehicle body even if there are fluctuations in the amount of separation between the window glass and the body, thus preventing intrusion of rainwater or the like into the body.

To attain the above object of the invention, there is provided a device for mounting a window glass molding, which comprises a molding holding member, a mounting member to be mounted on the vehicle body and flexible large and small arms for integrally coupling together the molding holding member and the mounting member. The large arm can permit a comparatively large displacement of the molding body to absorb dimensional errors in the thickness direction of the window glass. The small arm produces a greater biasing force than that of the large arm with less deformation, thus ensuring high urging force of the molding body against the window glass.

Thus, when the molding mounting device is secured to the vehicle body by urging the molding with the molding mounting device against the window glass, the molding can be reliably urged against the vehicle body even if there are dimensional fluctuations between the window glass and the body.

The above and other objects and features of the invention will become more apparent from the following detailed description with reference to the accompanying drawings.

DETAILED DESCRIPTION OF THE PREFERRED EMBODIMENT

Figure 3:
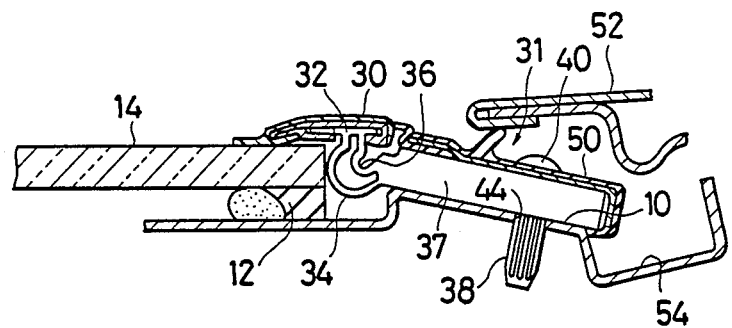
FIG. 3 is a sectional view showing a molding mounted on a vehicle body with a mounting device according to the invention.
Figure 4:
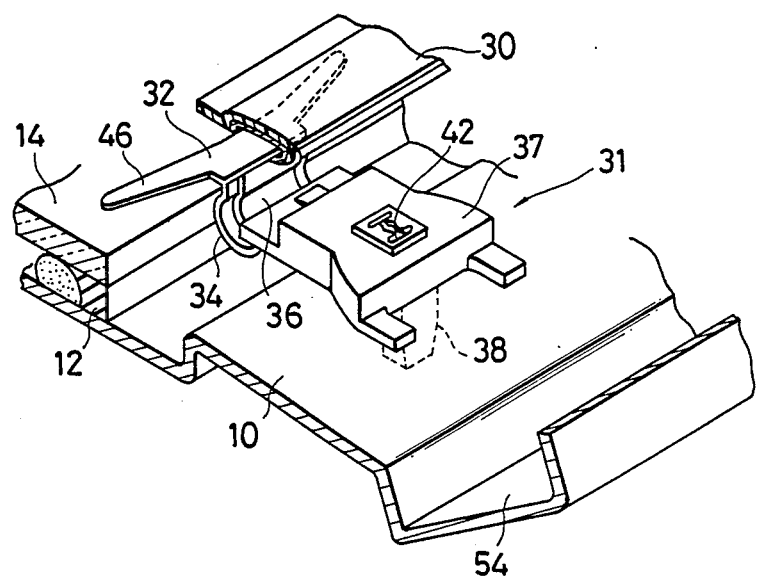
FIG. 4 is a perspective view showing the molding mounting device as shown in FIG. 3.

FIGS. 3 and 4 illustrate one embodiment of the molding mounting device according to the invention. A molding body 30 is mounted on a vehicle body 10 via mounting means 31. In FIG. 3, the leftward direction is the upward direction of the vehicle. The mounting means 31 includes a holding member 32 for supporting the molding body 30, a large arm 34, a small arm 36 and a mounting member 37 to be mounted on the vehicle body.

Figure 1:
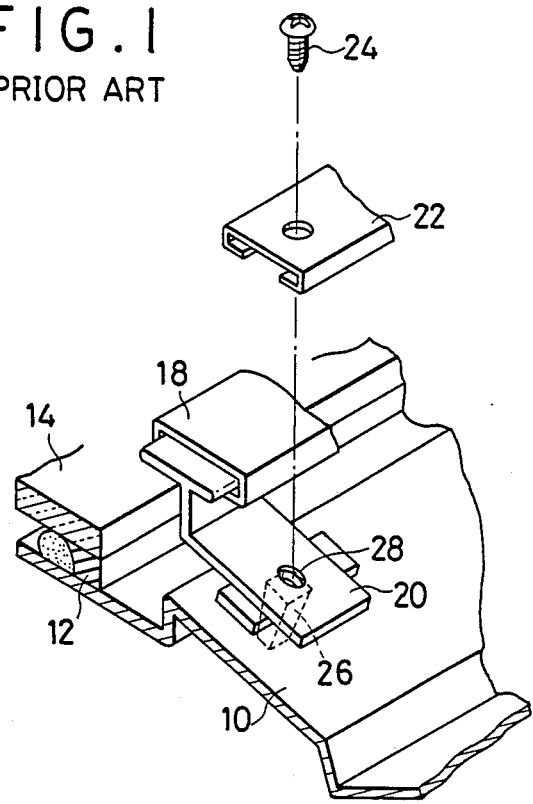
FIG. 1 is an exploded perspective view showing an example of a molding mounted on a vehicle body with a prior art mounting device.
Figure 2:
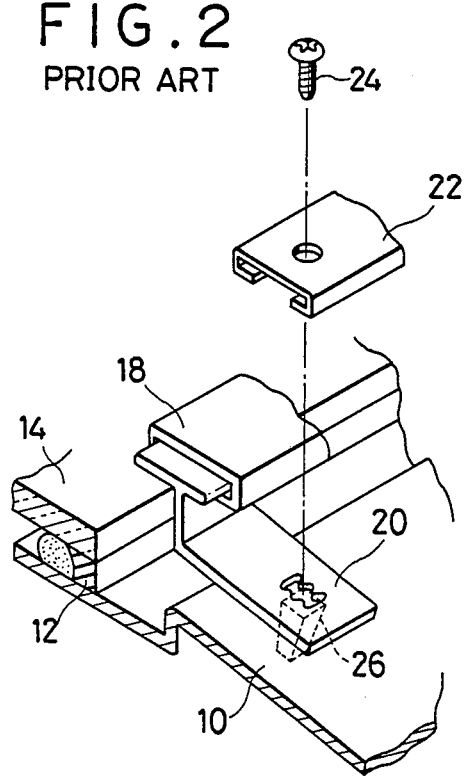
FIG. 2 is an exploded perspective view showing a different example of a molding mounted on a vehicle body with a prior art mounting device.

The mounting member 37, like the prior art example shown in FIG. 2, has a screw grommet 38 secured to it. The screw grommet 38 is rectangular, for instance, and has a hole 42 through which a tapping screw 40 is inserted. When the tapping screw 40 is screwed, the outer diameter of the screw grommet 38 is increased, whereby the hole 42 is increased in diameter inside a hole 44 formed in the body 10, so that it serves to prevent detachment of the screw grommet 38.

The large and small arms 34 and 36 each have an arcuate portion substantially constituting three-fourths of a circle. This arcuate portion is coupled at one end to the mounting member 37 and coupled at the other end via a short straight portion to the holding member 32, thereby holding the holding member 32.

The holding member 32 is fitted in the molding body 30, which has a substantially C-shaped sectional profile, and thus is secured to the molding body 30. The holding member 32 has a pair of extensions 46 extending in the opposite directions to reinforce the mounting of the molding body 30.

Now, the mounting of the molding body 30 in this embodiment will be explained.

The molding body 30 and mounting means 31 are assembled together by inserting the holding member 32 in the molding body 30.

Meanwhile, a rear window glass 14 is mounted on the body 10 via an adhesive 12. The molding body 30 is held in contact with an edge portion of the rear window glass 14, and the screw grommet 38 of the mounting member 37 of the mounting means 31 to be mounted on the vehicle body is inserted into the hole 44 of the body 10. Then, the tapping screw 40 is firmly secured to the screw grommet 38. Thus, the screw grommet 38 is expanded in the body 10 and reliably secured to the body 10.

At the time of the fastening of the tapping screw 40, an end portion of the molding body 30 is in contact with the surface of the rear window glass 14. As the fastening of the tapping screw 40 proceeds, the large and small arms 34 and 36 are deformed, so that the molding body 30 is displaced until it becomes nearly parallel to the rear window glass 14.

When a rear window glass 14 having a different thickness is mounted or when there is a large error in the dimension of the separation between the rear window glass and the body, the large arm 34 is greatly deformed to make up for the error. Since the large arm 34 has a large length, a large displacement of the molding body 30 toward the body 10 is permitted so as to absorb the dimensional error between the rear window glass 14 and the body 10. However, since the small arm 36 has a small length, a large reaction force is produced in it with a comparatively small movement of the molding body 30, so that the molding body 30 can be held firmly urged against the rear window glass 14.

Therefore, even a comparatively large error in the distance between the rear window glass 14 and the body 10 can be absorbed, and the rear window glass 14 can be secured to the body 10 with a large biasing force.

Before the fastening of the tapping screw 40 to the mounting member 37, a lower molding 50 of rubber with an inserted metal sheet is fitted on the mounting member 37, and an end of the molding body 30 opposite the glass is overlapped with the fastening of the tapping screw 40. A trunk lid 52 is provided such that it faces the lower molding 50. The vehicle body 10 has a groove 54 formed on the side of the mounting member 37 opposite the glass. Rainwater dropping from the glass surface is received in the groove 54.

In the above embodiment, the large and small arms 34 and 36 have substantially an equal sectional area perpendicular to the longitudinal direction. However, these arms may have different sectional areas. For example, the sectional area of the small arm 36 may be made greater than the sectional area of the large arm 34 to provide a stronger biasing force.

As has been described in the foregoing, the window glass molding mounting device according to the invention has highly flexible large and small arms provided between the holding member supporting the molding and the mounting member mounted on the vehicle body. It is thus possible to absorb a large dimensional error between the window glass and the vehicle body, prevent generation of rust and permit reliable mounting of the molding on the vehicle body.

What is claimed is:

1. A device for mounting a molding covering the edges of a window glass on a vehicle body, comprising a molding holding member for supporting the molding covering the edge of the glass, a mounting member to be mounted on the vehicle body and comprising flexible large and small arms integrally formed with said mounting member and with said molding holding member for adjustably coupling the holding member on the mounting member, said large arm being arcuate in profile and comprising at least substantially a semi-circle, and said small arm being arcuate in profile and comprising at least substantially a semi-circle, and said small arm being spaced from and disposed within the semi-circle of said large arm.

2. A molding mounting device according to claim 1, wherein said large arm has an arcuate sectional profile constituting substantially three-fourths of a circle.

3. A molding mounting device according to claim 1, wherein said small arm has a substantially arcuate sectional profile constituting substantially three-fourths of a circle.

* * * * *